United States Patent
Edenfeld

(10) Patent No.: US 9,617,976 B2
(45) Date of Patent: Apr. 11, 2017

(54) SYSTEMS AND METHODS FOR INCREASING WIND TURBINE POWER OUTPUT

(71) Applicant: General Electric Company, Schenectady, NY (US)

(72) Inventor: Thomas Edenfeld, Osnabruck (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/249,539

(22) Filed: Aug. 29, 2016

(65) Prior Publication Data

US 2016/0369776 A1     Dec. 22, 2016

Related U.S. Application Data

(62) Division of application No. 14/574,495, filed on Dec. 18, 2014, now Pat. No. 9,447,772.

(51) Int. Cl.

| | | |
|---|---|---|
| *F03D 9/00* | (2016.01) | |
| *H02P 9/04* | (2006.01) | |
| *F03D 7/02* | (2006.01) | |
| *F03D 7/04* | (2006.01) | |
| *H02J 3/38* | (2006.01) | |
| *H02P 9/00* | (2006.01) | |
| *F03D 9/25* | (2016.01) | |
| *H02P 11/00* | (2006.01) | |

(52) U.S. Cl.
CPC ........... *F03D 7/0272* (2013.01); *F03D 7/028* (2013.01); *F03D 7/0276* (2013.01); *F03D 7/048* (2013.01); *F03D 9/005* (2013.01); *F03D 9/25* (2016.05); *H02J 3/386* (2013.01); *H02P 9/007* (2013.01); *H02P 9/008* (2013.01); *F05B 2220/70646* (2013.01); *F05B 2270/32* (2013.01); *Y02E 10/723* (2013.01); *Y02E 10/725* (2013.01)

(58) Field of Classification Search
USPC ....................................... 290/44, 55; 322/25
See application file for complete search history.

(56) References Cited

U.S. PATENT DOCUMENTS

| | | | | |
|---|---|---|---|---|
| 5,798,631 | A * | 8/1998 | Spee ..................... | F03D 7/0272 290/31 |
| 8,207,623 | B2 * | 6/2012 | Rivas .................... | F03D 7/0224 290/44 |
| 8,860,236 | B2 * | 10/2014 | Nasiri ................... | F03D 7/0272 290/44 |

(Continued)

*Primary Examiner* — Pedro J Cuevas
(74) *Attorney, Agent, or Firm* — Dority & Manning, P.A.

(57) ABSTRACT

Systems and methods for increasing the power output of wind turbines in a wind farm are disclosed. In particular, a wind farm can include first and second doubly fed induction generator wind turbine systems. The rotational rotor speed of the first wind turbine system can be regulated at reduced wind speeds based at least in part on data indicative of rotor voltage to increase power output of a doubly fed induction generator. The rotor speed can be regulated such that the rotor voltage does not exceed a voltage threshold. The power output of the first wind turbine system can be further increased by reducing its reactive power output. The reduced reactive power output of the first wind turbine system can be compensated for by an increased reactive power output of the second wind turbine system.

6 Claims, 5 Drawing Sheets

(56) References Cited

U.S. PATENT DOCUMENTS

| | | | | |
|---|---|---|---|---|
| 2008/0150285 A1* | 6/2008 | Corcelles Pereira | H02J 3/1807 | 290/44 |
| 2009/0278352 A1* | 11/2009 | Rivas | F03D 7/0224 | 290/44 |
| 2011/0018270 A1* | 1/2011 | Corcelles Pereira | H02J 3/1807 | 290/44 |
| 2011/0089693 A1* | 4/2011 | Nasiri | F03D 7/0272 | 290/44 |

* cited by examiner

SYSTEMS AND METHODS FOR INCREASING WIND TURBINE POWER OUTPUT

PRIORITY CLAIM

The present application is a divisional of U.S. application Ser. No. 14/574,495 having a filing date of Dec. 18, 2014. Applicant claims priority to and benefit of all such applications and incorporate all such applications herein by reference.

FIELD OF THE INVENTION

The present disclosure relates generally to wind turbines, and more particularly to system and methods for increasing the power output of a doubly fed induction generator wind turbine system at reduced wind speeds.

BACKGROUND OF THE INVENTION

Wind power has received increased attention as being one of the cleanest, most environmentally friendly energy sources presently available. A typical modern wind turbine can include a tower, a generator, a gearbox, a nacelle, and a rotor having one or more rotor blades. The rotor blades can transform wind energy into a mechanical rotational torque that drives one or more generators via the rotor. The one or more generators can be, for instance, coupled to the rotor via a gearbox. The gearbox can step up the inherently low rotational speed of the rotor such that the generator can efficiently convert the mechanical rotational energy to electrical energy, which can be fed into a utility grid via at least one electrical connection.

Wind turbines can use a variable speed operation such that the speed of a turbine blade changes with changes in wind speed. However, as the speed of the turbine fluctuates, the frequency of alternating current flowing from the generator also fluctuates. Accordingly, variable speed turbine configurations can also include power converters that can be used to convert a frequency of generated electrical power to a frequency substantially similar to a utility grid frequency. Such power converters can typically comprise an AC-DC-AC topology with a regulated DC link, and can be controlled by a converter controller.

Such wind turbines can use variable speed operations to optimize loads and to improve turbine output. In particular, wind turbines are most efficient when they operate at an optimum tip-speed ratio. Tip-speed ratio is the ratio between the tangential speed of the tip of a turbine blade and the velocity of the wind at the wind turbine. Accordingly, a wind turbine will collect more wind energy operating at the optimum tip-speed ratio than it will if operating outside the optimum tip-speed ratio.

For many wind turbines, the operating space, and hence value to the customer, is limited by maximum voltages for one or more wind turbine components inherent to wind turbine systems. For instance, a power converter in a wind turbine system can have a voltage constraint that limits the minimum and maximum speed values of the generator.

Thus, a need exists for systems and methods for increasing the power output of a wind turbine system at reduced wind speeds while also maintaining power converter voltage levels within specified operating limits.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a wind turbine system. The wind turbine system includes a wind driven doubly fed induction generator having a rotor and a stator. The stator provides AC power to a stator bus. The wind turbine system further includes a power converter coupled to the rotor of the doubly fed induction generator via a rotor bus. The power converter provides an output to a line bus. The power converter has an associated voltage threshold at the rotor bus. The wind turbine system further includes a control system configured to identify a reduced wind speed at the doubly fed induction generator. At the reduced wind speed, the control system is further configured to regulate the rotational speed of the rotor of the doubly fed induction generator based at least in part on data indicative of the rotor voltage to increase the power output of the doubly fed induction generator. The control system regulates the rotational speed of the rotor such that the rotor voltage does not exceed a voltage threshold associated with the power converter at the rotor bus.

Another example aspect of the present disclosure is directed to a method for increasing power output of a wind driven doubly fed induction generator at reduced wind speeds. The method includes generating alternating current power at a wind driven doubly fed induction generator. The alternating current power is provided to a stator bus from a stator of the wind driven doubly fed induction generator. The method further includes providing a rotor voltage from a power converter to a rotor of a wind driven doubly fed induction generator via a rotor bus. The method further includes detecting a reduced wind speed at the wind driven doubly fed induction generator. The method further includes, in response to detecting the reduced wind speed, reducing the rotational speed of the rotor from a first rotational speed to a second rotational speed based at least in part on data indicative of the rotor voltage to increase the power output of the doubly fed induction generator. The second rotational speed is determined such that the rotor voltage does not exceed a voltage threshold associated with the power converter at the rotor bus.

Yet another example aspect of the present disclosure is directed to a wind farm. The wind farm comprises a first doubly fed induction generator having a rotor and a stator, a second doubly fed induction generator having a rotor and a stator, and a control system. The control system is configured to detect a reduced wind speed at the first doubly fed induction generator. In response to detecting the reduced wind speed at the first doubly fed induction generator, the control system is configured to control the first doubly fed induction generator to reduce a reactive power output of the first doubly fed induction generator and to reduce the rotational speed of the rotor of the first doubly fed induction generator to increase power output of the first doubly fed induction generator. The control system is further configured to control the second doubly fed induction generator to increase a reactive power output of the second doubly fed induction generator.

Variations and modifications can be made to these example aspects of the present disclosure.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
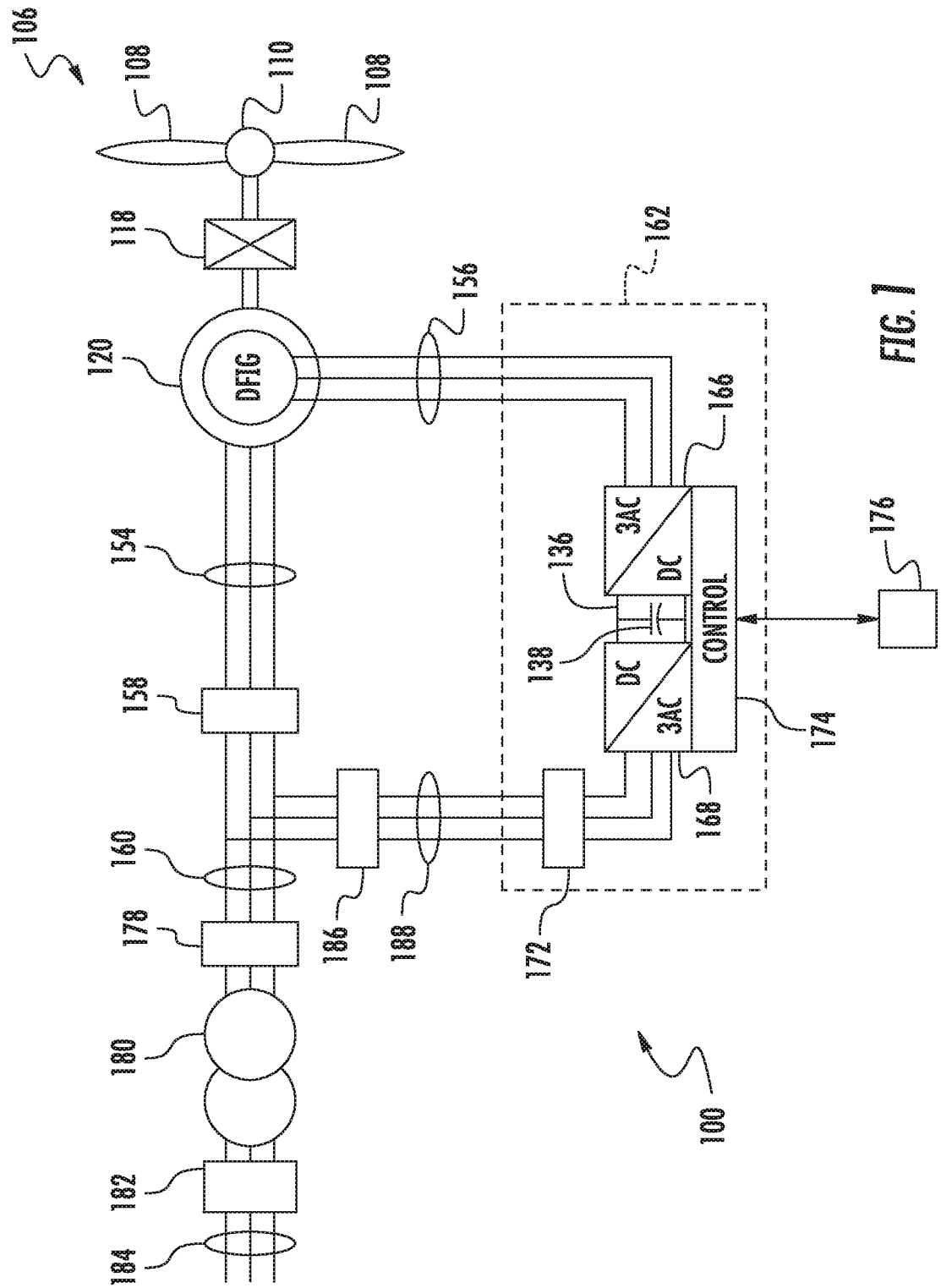
FIG. 1 depicts an example doubly fed induction generator (DFIG) wind turbine system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for increasing power output in a doubly fed induction generator (DFIG) wind turbine system at reduced wind speeds. The DFIG system can include a wind driven doubly fed induction generator having a rotor and a stator. The stator can provide AC power to a stator bus. The rotor can provide AC power to a power converter via a rotor bus. The power converter can provide an output to a line bus. The stator bus and the line bus can be coupled to an electrical grid through a transformer, such as a two-winding transformer or a three-winding transformer.

According to example aspects of the present disclosure, the rotational speed of the rotor of the doubly fed induction generator can be regulated at reduced wind speeds to increase the output power of the doubly fed induction generator system. For instance, the rotational speed of the rotor can be reduced to operate the wind turbine at or near an optimum tip-speed ratio at reduced wind speeds.

Reducing the rotor speed at cut-in wind speed can provide an increased slip at the doubly fed induction generator. In particular, slip is the difference between the operating speed and the synchronous speed of a doubly fed induction generator divided by the synchronous speed. The operating speed is the rotational speed of the rotor and the synchronous speed is the rotational speed of the magnetic field of the stator. Increased slip can cause increased rotor voltage of a doubly fed induction generator. Rotor voltage equals locked rotor voltage multiplied by slip. Accordingly, reduction of the rotational rotor speed of a doubly fed induction generator can provide an increased slip, which results in increased rotor voltage.

The lowest and highest speed points of a doubly fed induction generator system are generally limited by a voltage capability of the power converter. Other factors can include an electric grid voltage and reactive power demand. Accordingly, at cut in wind speeds, the rotational speed of the rotor of the doubly fed induction generator can be regulated such that the power converter voltage at the rotor bus does not exceed the voltage capability of the power converter. Such regulation can improve wind turbine efficiency by increasing the speed range of the rotor at cut-in wind speed and causing the wind turbine system to collect more energy from the wind.

More particularly, the rotational speed of the rotor can be regulated according to example aspects of the present disclosure based at least in part on data indicative of the rotor voltage to increase the power output of the doubly fed induction generator at reduced wind speeds. For instance, the rotational speed of the rotor can be regulated such that the rotor voltage does not exceed a voltage threshold associated with the power converter at the rotor bus. The data indicative of the rotor voltage can be determined, for instance, by one or more sensors. For instance, one or more sensors can be placed at the rotor bus to detect a voltage at the rotor of the doubly fed induction generator. This detected rotor voltage can be used by a controller (e.g. a wind farm control system and/or individual wind turbine controller) to regulate the rotational speed of the rotor such that the rotor voltage does not exceed the voltage threshold.

The data indicative of rotor voltage can further be determined in other suitable ways such as from the reactive power output of the doubly fed induction generator. For instance, a lookup table can be used by a controller to regulate the rotational rotor speed of the doubly fed induction generator. The lookup table can define a correlation between various rotor speed points and various grid voltage and reactive power/power factor conditions.

According to example aspects of the present disclosure, the rotor speed range can be further increased by reducing a reactive power output of the doubly fed induction generator at reduced wind speeds. Such reduction in reactive power output can be used to allow the doubly fed induction generator wind turbine system to operate at or near the optimum tip-speed ratio. For instance, if the rotor voltage is at the voltage threshold but the wind turbine system is not operating at the optimum tip-speed ratio, a further reduction in rotational rotor speed can be necessary for the wind turbine system to operate at or near the optimum tip-speed ratio. Accordingly, the reactive power output of the doubly fed induction generator can be reduced to facilitate such reduction in rotational rotor speed.

Rotor voltage can be dependent on electric grid voltage and reactive power demand. Accordingly, reduced reactive power output at reduced wind speeds can allow for an increased reduction in rotational speed of the rotor of the doubly fed induction generator without exceeding the voltage capabilities of the power converter. The increased reduction in rotational speed of the rotor can be such that the power converter voltage at the rotor bus does not exceed the voltage threshold.

In one example implementation, a wind farm can include a plurality of wind turbines, such as a first wind turbine system and a second wind turbine system, each coupled to an electrical grid. The wind farm can further include a control system configured to detect a reduced wind speed at a doubly fed induction generator of the first wind turbine system. For instance, the first wind turbine system can be located in the middle of the wind farm where wind speeds can be sometimes reduced relative to wind speeds at the perimeter of the wind farm. In response to detecting the reduced wind speed, the control system can be configured to control the doubly fed induction generator of the first wind turbine system to reduce the reactive power output of the first wind turbine system. This can allow for an increased reduction in rotational speed of the rotor of a doubly fed induction generator associated with the first wind turbine system. The rotational speed of the rotor can be reduced such that the voltage of a power converter coupled to the doubly fed induction generator via a rotor bus does not exceed a voltage threshold at the rotor bus.

The control system can be further configured to control the doubly fed induction generator of the second wind turbine system to increase a reactive power output of the doubly fed induction generator. Such increase in reactive power output can be determined based at least in part on a reactive power demand from the electric grid. In particular, the increased reactive power output of the second wind turbine system can compensate for the reduced reactive power output of the first wind turbine system, for instance, to meet a reactive power demand of the electrical grid.

Referring now to the drawings, FIG. 1 depicts an example doubly fed induction generator (DFIG) wind turbine system 100 according to example embodiments of the present disclosure. System 100 includes a plurality of rotor blades 108 coupled to a rotating hub 110, which together define a propeller 106. The propeller 106 is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. Stator bus 154 provides an output multiphase power (e.g. three-phase power) from a stator of DFIG 120 and the rotor bus 156 provides an output multiphase power (e.g. three-phase power) from a rotor of DFIG 120. DFIG 120 can further be coupled to a controller 174 to control the operation of DFIG 120. It should be noted that controller 174, in typical embodiments, is configured as an interface between DFIG 120 and a control system 176. Controller 174 can include any number of control devices. In one implementation, controller 174 can include a processing device (e.g. microprocessor, microcontroller, etc.) executing computer-readable instructions stored in a computer-readable medium. The instructions when executed by the processing device can cause the processing device to perform operations, including providing control commands to DFIG 120.

Figure 2:
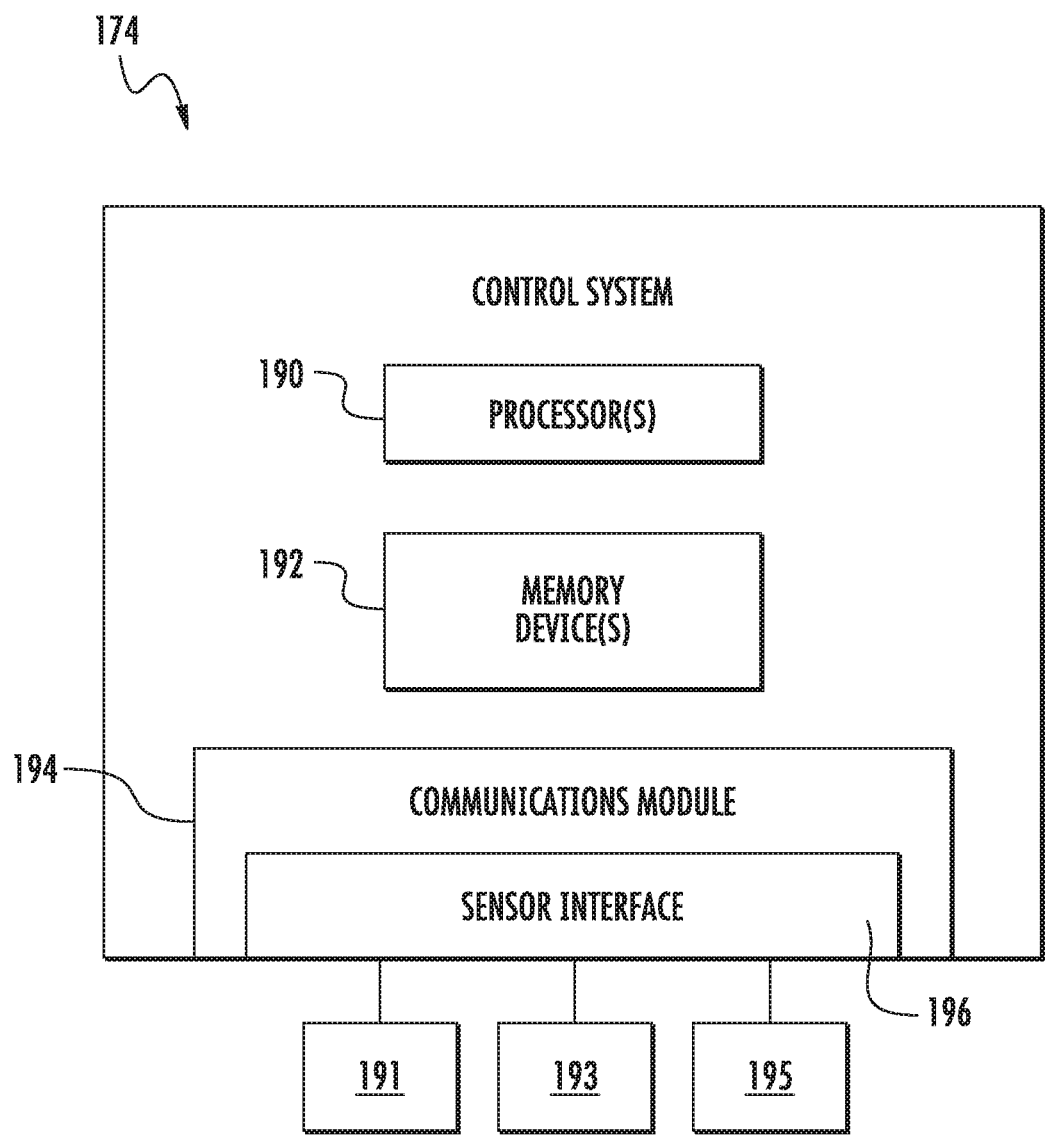
FIG. 2 depicts an example controller according to example embodiments of the present disclosure.

For example, as shown particularly in FIG. 2, controller 174 can include any number of control devices. In one implementation, for example, controller 174 can include one or more processor(s) 190 and associated memory device(s) 192 configured to perform a variety of computer-implemented functions and/or instructions (e.g., performing the methods, steps, calculations and the like and storing relevant data as disclosed herein). The instructions when executed by the processor 190 can cause the processor 190 to perform operations, including providing control commands (e.g. pulse width modulation commands) to the switching elements of the power converter 162 and other aspects of the power system 100. Additionally, controller 174 may also include a communications module 194 to facilitate communications between the control system 174 and the various components of the power system 100, such as any of the components of FIG. 1.

Further, the communications module 194 may include a sensor interface 196 (e.g., one or more analog-to-digital converters) to permit signals transmitted from one or more sensors to be converted into signals that can be understood and processed by the processors 190. It should be appreciated that the sensors (e.g. sensors 191, 193, 195) may be communicatively coupled to the communications module 194 using any suitable means. For example, as shown in FIG. 2, the sensors 191, 193, 195 are coupled to the sensor interface 196 via a wired connection. However, in other embodiments, the sensors 191, 193, 195 may be coupled to the sensor interface 196 via a wireless connection, such as by using any suitable wireless communications protocol known in the art. As such, the processor 190 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 190 is also configured to compute advanced control algorithms and communicate to a variety of Ethernet or serial-based protocols (Modbus, OPC, CAN, etc.). Additionally, the memory device(s) 192 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 192 may generally be configured to store suitable computer-readable instructions that, when implemented by the processor(s) 190, configure controller 174 to perform the various functions as described herein.

Referring back to FIG. 1, DFIG 120 is coupled via rotor bus 156 to a rotor side converter 166. Rotor side converter 166 is coupled to a line side converter 168, which, in turn, is coupled to a line side bus 188. In example configurations, rotor side converter 166 and line side converter 168 are configured for normal operating mode in a three-phase, pulse width modulation (PWM) arrangement using insulated gate bipolar transistors (IGBT) switching elements. Rotor side converter 166 and line side converter 168 can be coupled via a DC link 136 across which is a DC link capacitor 138.

Power converter 162 can also be coupled to controller 174 to control the operation of rotor side converter 166 and line side converter 168. In one implementation, further instructions stored in controller 174, when executed by the processing device, can cause the processing device to perform operations, including providing control commands (e.g. pulse width modulation commands) to the switching elements of power converter 162.

In typical configurations, various line contactors and circuit breakers including, for example, grid breaker 182 can be included for isolating the various components as necessary for normal operation of DFIG 120 during connection to and disconnection from the electrical grid 184. A system circuit breaker 178 can couple a system bus 160 to a transformer 180, which is coupled to an electrical grid 184 via grid breaker 182. Although transformer 180 depicts a two winding transformer, other suitable transformers can be used, such as a three-winding transformer. In an embodiment using a three-winding transformer, the line bus 188 can be coupled to one winding of the transformer, the stator bus 154 can be coupled to another winding of the transformer, and the grid 184 can be coupled to another winding of the transformer.

In operation, alternating current power generated at DFIG 120 by rotating rotor 106 is provided via a dual path to electrical grid 184. The dual paths are defined by stator bus 154 and rotor bus 156. On the rotor bus side 156, sinusoidal multi-phase (e.g. three-phase) alternating current (AC) power is provided to power converter 162. Rotor side power converter 166 converts the AC power provided from rotor bus 156 into direct current (DC) power and provides the DC power to DC link 136. Switching elements (e.g. IGBTs) used in parallel bridge circuits of rotor side power converter 166 can be modulated to convert the AC power provided from rotor bus 156 into DC power suitable for DC link 136.

Line side converter 168 converts the DC power on DC link 136 into AC output power suitable for electrical grid 184. In particular, switching elements (e.g. IGBTs) used in bridge circuits of line side power converter 168 can be modulated to convert the DC power on DC link 136 into AC power on line side bus 188. The AC power from power converter 162 can be combined with the power from the stator of DFIG 120 to provide multi-phase power (e.g. three-phase power) having a frequency maintained substantially at the frequency of electrical grid 184 (e.g. 50 Hz/60 Hz).

Various circuit breakers and switches, such as grid breaker 182, system breaker 178, stator sync switch 158, converter breaker 186, and line contactor 172 can be included in system 100 to connect or disconnect corresponding buses, for example, when current flow is excessive and can damage components of wind turbine system 100 or for other operational considerations. Additional protection components can also be included in wind turbine system 100.

DFIG 120 and power converter 162 can receive control signals from, for instance, control system 176 via controller 174. The control signals can be based, among other things, on sensed conditions or operating characteristics of wind turbine system 100. Typically, the control signals provide for control of the operation of DFIG 120 and/or power converter 162. For example, feedback in the form of a voltage at rotor bus 156 of power converter 162 can be used to regulate the rotational speed of the rotor of DFIG 120. As another example, feedback in the form of sensed rotor speed of DFIG 120 can be used to control the conversion of the output power from rotor bus 156 to maintain a proper and balanced multi-phase (e.g. three-phase) power supply. Other feedback from other sensors can also be used by controller 174 to control DFIG 120 and/or power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to aspects of the present disclosure, the rotational speed of the rotor of DFIG 120 can be regulated based at least in part on a voltage threshold associated with power converter 166 at rotor bus 156. In particular, the wind speed range of system 100 can be limited by a voltage capability of power converter 162. In particular, the minimum and maximum wind speed points of system 100 can be limited by the voltage capability of power converter 162. The voltage threshold associated with power converter 162 can be determined based at least in part on the voltage capability of power converter 162. Accordingly, at cut-in wind speed, controller 174 can be configured to control DFIG 120 to reduce the rotational speed of the rotor of DFIG 120 such that the voltage of power converter 162 at rotor bus 156 does not exceed the voltage threshold associated with power converter 162.

For instance, for an 1800V IGBT converter, the voltage capability can be in the range of about 759 V. As used herein, the use of the term "about" in conjunction with a numerical value is intended to refer to within about 25% of the numerical value. This voltage constraint can cause system 100 to lose energy at cut-in wind speed. Accordingly, at a power factor of 1, the rotational speed of the rotor of a 50 Hz DFIG can be reduced to 925 rpm at cut-in wind speed as opposed to 1080 rpm, at which the DFIG would normally operate.

Figure 3:
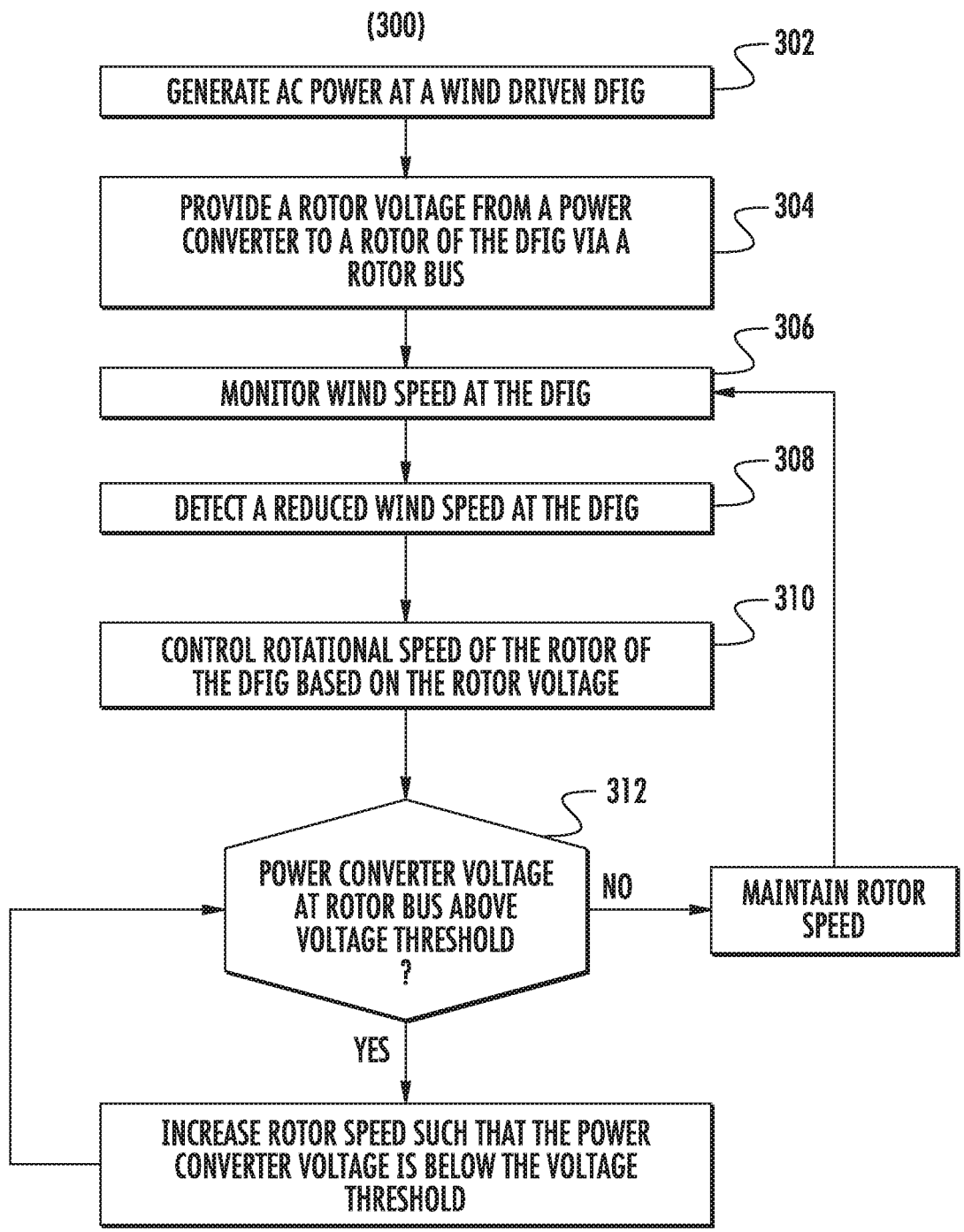
FIG. 3 depicts a flow diagram of an example method for increasing the power output of a DFIG wind turbine system according to example embodiments of the present disclosure.

FIG. 3 depicts a flow diagram for an example method (300) of increasing power output of a DFIG wind turbine system according to example embodiments of the present disclosure. FIG. 3 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (302), method (300) can include generating alternating current power at a wind driven doubly fed induction generator. The alternating current power can be provided to a stator bus from a stator of the wind driven doubly fed induction generator. At (304), method (300) can include providing a rotor voltage from a power converter to a rotor of the wind driven doubly fed induction generator via a rotor bus.

At (306), method (300) can include monitoring wind speed at the wind driven doubly fed induction generator. The wind speed can be determined, for instance by an anemometer associated with the wind driven doubly fed induction generator.

At (308), method (300) can include detecting a reduced wind speed at the wind driven doubly fed induction generator. The reduced wind speed can be, for instance, the cut-in speed for the wind driven doubly fed induction generator.

In response to detecting the reduced wind speed, at (310), method (300) can include controlling the rotational speed of the rotor of the wind driven doubly fed induction generator based at least in part on data indicative of the rotor voltage. The data indicative of the rotor voltage can include signals from one or more sensors at the rotor bus and/or data in a lookup table correlating various rotor speed points with various grid voltage and reactive power/power factor conditions.

According to particular aspects of the present disclosure, the rotational rotor speed can be reduced such that the rotor voltage does not exceed a voltage threshold associated with the power converter at the rotor bus. For instance, a controller can send control commands to the wind driven doubly fed induction generator to reduce the rotational rotor speed of the wind driven doubly fed induction generator from a first rotational speed to a second rotational speed. The second rotational speed can be determined such that the wind turbine system operates, for instance, at or near an optimum tip-speed ratio to increase the power output of the doubly fed induction generator. The second rotational speed can further be determined such that the power converter voltage at the rotor bus does not exceed the voltage threshold.

At (312), method (300) can include further controlling the rotational speed of the rotor of the wind driven doubly fed induction generator based at least in part on the voltage threshold associated with the power converter. If the power converter voltage on the rotor side exceeds the voltage threshold, (312) can include increasing the rotational speed of the rotor to decrease the slip and the rotor voltage of the doubly fed induction generator. The rotational rotor speed can be increased such that the power converter voltage at the rotor bus does not exceed the voltage threshold. If the voltage does not exceed the voltage threshold, (312) can include maintaining the rotational speed of the rotor of the DFIG and method (300) can include returning to (306).

Figure 4:
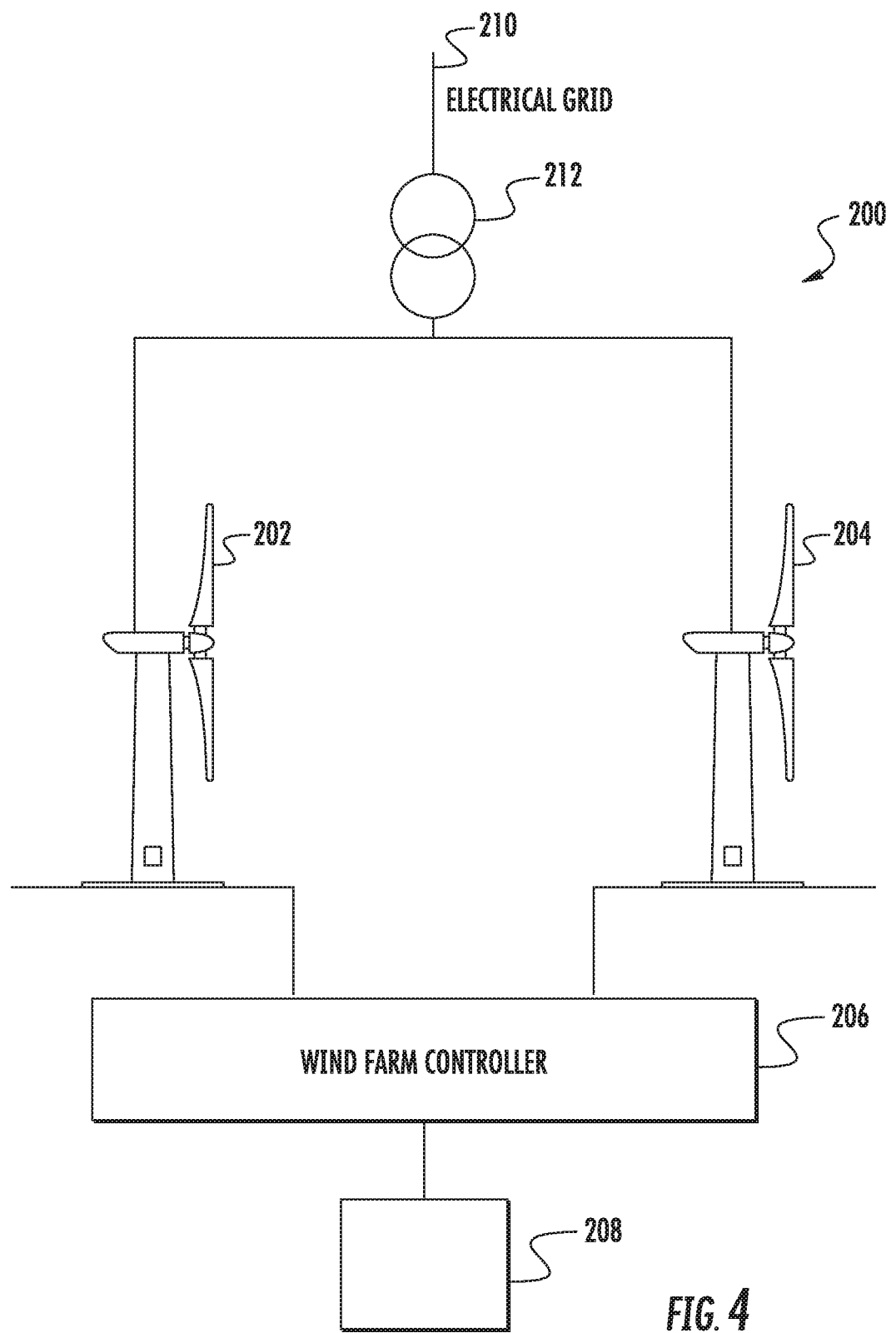
FIG. 4 depicts an example wind farm according to example embodiments of the present disclosure.

According to example aspects of the present disclosure, a plurality of wind turbine systems, such as wind turbine system 100 depicted in FIG. 1, can be a part of a wind farm. FIG. 4 depicts an example wind farm 200 according to example embodiments of the present disclosure. Wind farm 200 includes wind turbine system 202 and wind turbine system 204. Wind turbine systems 202 and 204 can be DFIG systems, such as system 100 as described in FIG. 1. Although only two wind turbine systems are depicted, it will be appreciated by those skilled in the art that any suitable number of wind turbine systems can be included in wind farm 200. Wind turbine systems 202 and 204 can each be coupled to wind farm controller 206. Wind farm controller 206, in typical embodiments, is configured as an interface between wind farm 200 and a control system 208. Wind farm controller 206 can include any number of control devices. In one implementation, wind farm control system can include a processing device (e.g. microprocessor, microcontroller, etc.) executing computer-readable instructions stored in a computer-readable medium. The instructions when executed by the processing device can cause the processing device to perform operations, including providing control commands to wind turbine systems 202 and 204.

Wind farm 200 can further be coupled to an electrical grid 210 via a transformer 212. Transformer 212 comprises a two-winding transformer, but it will be appreciated by those skilled in the art that various other suitable transformers can be used, such as a three-winding transformer. Wind farm 200 can output multiphase power (e.g. three-phase power) to electrical grid 210 via transformer 212. The output power level of wind farm 200 can be controlled at least in part by wind farm controller 206.

In particular, wind farm controller 206 can receive command values from, for instance, control system 208, indicative of target power values for wind farm 200. Target power values can include active power values and/or reactive power values. The target power values can be determined based at least in part on a power demand from electrical grid 210. Further, wind farm controller 206 can receive measurement data indicative of wind farm 200 active power, reactive power, voltage, frequency at the grid connecting point, etc.

Further still, wind farm controller 206 can receive turbine measurement data from wind turbine systems 202 and 204. For instance, turbine measurement data can include the frequency of power output from a DFIG, voltages, currents, active power outputs, reactive power outputs, wind speed, power factor, etc. Based at least in part on the various received data, wind farm controller 206 can determine command values for wind turbine systems 202 and 204. Wind turbine systems 202 and 204 can then use control systems included in wind turbine systems 202 and 204, such as control system 176 depicted in FIG. 1, to control the respective wind turbine systems 202 and 204 in accordance with the command values from wind farm controller 206.

In example embodiments, wind farm controller 206 can determine command controls for wind turbine systems 202 and 204 based at least in part on a lookup table. The lookup table can define a correlation between various rotor speed points and various electric grid voltage and reactive power demand conditions.

Figure 5:
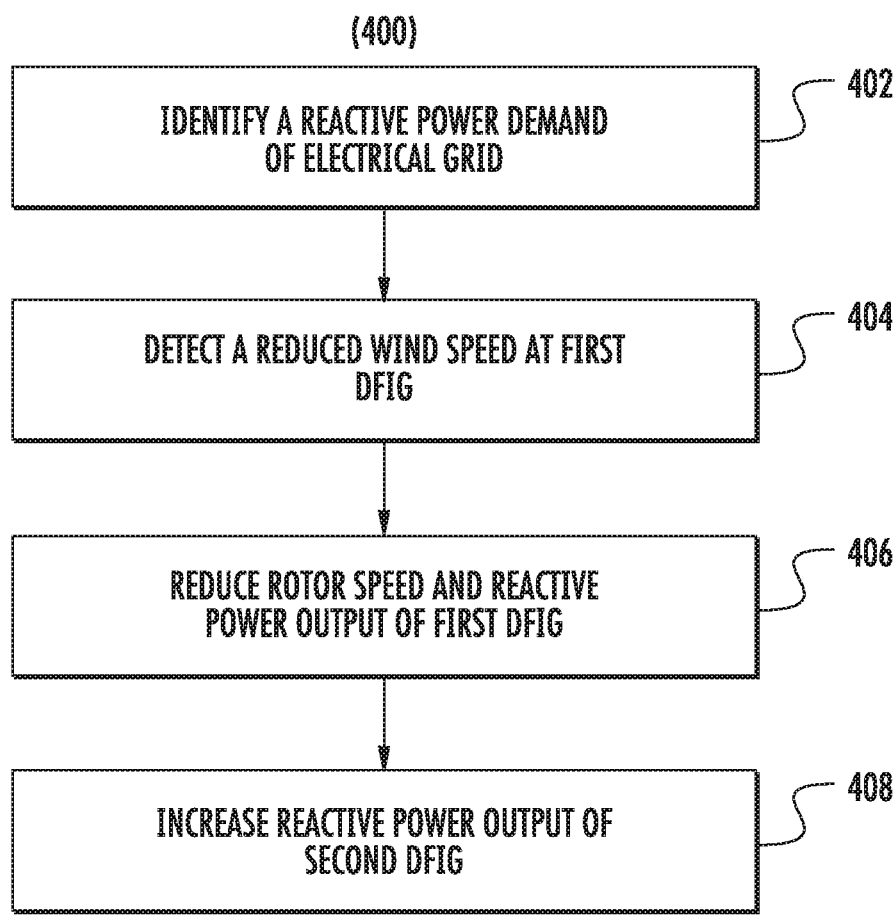
FIG. 5 depicts a flow diagram of an example method for increasing the power output of a wind farm according to example embodiments of the present disclosure.

FIG. 5 depicts a flow diagram of an example method (400) for increasing the power output of a wind farm at reduced wind speeds according to example embodiments of the present disclosure. The rotor speed range of a doubly fed induction generator can be further increased by reducing a reactive power output at reduced wind speeds. Accordingly, at (402), method 400 can include identifying a reactive power demand of an electrical grid. The electrical grid can be coupled to a wind farm, such as wind farm 200 depicted in FIG. 4. The wind farm can include, for instance, a first doubly fed induction generator and a second doubly fed induction generator. The reactive power demand of the electrical grid can be determined based at least in part on various grid conditions associated with the electrical loads coupled to the grid.

At (404), method (400) can include detecting a reduced wind speed at the first doubly fed induction generator. The reduced wind speed can be, for instance, the cut-in wind speed of the doubly fed induction generator. In response to detecting the reduced wind speed at the first doubly fed induction generator, at (406), method (400) can include reducing the reactive power output and the rotational rotor speed of the doubly fed induction generator to increase power output of the doubly fed induction generator. The rotational speed can be reduced such that the voltage of a power converter coupled to the rotor of the doubly fed induction generator does not exceed a voltage threshold at the rotor bus.

The reduced reactive power output can allow for an increased reduction in rotational rotor speed of the doubly fed induction generator. The increased reduction of rotational speed of the rotor can be such that the voltage at the rotor bus of the power converter does not exceed the voltage threshold associated with the power converter.

At (408), method (400) can include increasing a reactive power output of the second doubly fed induction generator. The reactive power output of the second doubly fed induction generator can be determined based at least in part on the identified electrical grid reactive power demand. For instance, the reactive power output of the second doubly fed induction generator can be increased to compensate for the decreased reactive power output of the first doubly fed induction generator. The increased reactive power output of the second doubly fed induction generator can be determined such that the overall reactive power output of the wind farm meets the required reactive power demand for the wind farm from the electrical grid.

EXAMPLE

Table 1 displays example simulation results according to example embodiments of the present disclosure. In particular, Table 1 displays power outputs of a doubly fed induction generator at reduced wind speeds for different rotational rotor speeds. For instance, as indicated by Table 1, at a wind speed of 4 m/s, reducing the rotational rotor speed from 1065 rpm to 925 rpm provides a 31 kW increase in power output of the doubly fed induction generator.

TABLE 1

| Wind Speed [m/s] | 1065 rpm Power [kW] | 925 rpm Power [kW] | Difference Power [kW] |
|---|---|---|---|
| 3.00 | 5 | 29 | 24 |
| 3.50 | 63 | 90 | 17 |
| 4.00 | 129 | 160 | 31 |
| 4.50 | 225 | 239 | 14 |
| 5.00 | 301 | 328 | 27 |
| 5.50 | 470 | 474 | 4 |
| 6.00 | 589 | 597 | 8 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind farm, the wind farm comprising:
   A first wind turbine system having a first doubly fed induction generator, the first doubly fed induction generator having a rotor and a stator;
   A second wind turbine system having a second doubly fed induction generator, the second doubly fed induction generator having a rotor and a stator; and
   a control system, the control system configured to detect a reduced wind speed at the first doubly fed induction generator;
   wherein in response to detecting the reduced wind speed at the first doubly fed induction generator, the control system is configured to control the first doubly fed induction generator to reduce a reactive power output of the first doubly fed induction generator and to reduce the rotational speed of the rotor of the first doubly fed induction generator to increase power output of the first doubly fed induction generator,
   wherein the control system further configured to control the second doubly fed induction generator to increase a reactive power output of the second doubly fed induction generator.

2. The wind farm of claim 1, wherein the rotor of the first doubly fed induction generator is coupled to a power converter via a rotor bus, the power converter having an associated voltage threshold at the rotor bus.

3. The wind farm of claim 2, wherein the rotational speed of the rotor of the first doubly fed induction generator is reduced such that the power converter voltage at the rotor bus does not exceed the voltage threshold.

4. The wind farm of claim 1, wherein the increased reactive power output of the second doubly fed induction generator is determined based at least in part on a reactive power demand from the electrical grid.

5. The wind farm of claim 1, wherein the reduction in the rotational speed of the rotor of the first doubly fed induction generator provides increased slip at the doubly fed induction generator.

6. The wind farm of claim 1, wherein the reduced reactive power output of the first doubly fed induction generator facilitates an increased reduction in rotational speed of the rotor of the doubly fed induction generator such that the power converter voltage at the rotor bus does not exceed the voltage threshold.

* * * * *